United States Patent
Costa et al.

(10) Patent No.: US 11,328,211 B2
(45) Date of Patent: May 10, 2022

(54) DELIMITATION IN UNSUPERVISED CLASSIFICATION OF GESTURES

(71) Applicant: Facebook Technologies, LLC, Menlo Park, CA (US)

(72) Inventors: Ricardo Jorge Jota Costa, Toronto (CA); Clifton Forlines, South Portland, ME (US)

(73) Assignee: Facebook Technologies, LLC, Menlo Park, CA (US)

( * ) Notice: Subject to any disclaimer, the term of this patent is extended or adjusted under 35 U.S.C. 154(b) by 795 days.

(21) Appl. No.: 16/029,146

(22) Filed: Jul. 6, 2018

(65) Prior Publication Data
US 2020/0012946 A1 Jan. 9, 2020

(51) Int. Cl.
| | | |
|---|---|---|
| G06F 3/08 | (2006.01) | |
| G06N 3/08 | (2006.01) | |
| G06F 3/01 | (2006.01) | |
| B60K 35/00 | (2006.01) | |
| G06F 3/044 | (2006.01) | |
| B60K 37/00 | (2006.01) | |

(52) U.S. Cl.
CPC ............. *G06N 3/088* (2013.01); *B60K 35/00* (2013.01); *B60K 37/00* (2013.01); *G06F 3/017* (2013.01); *G06F 3/044* (2013.01); *B60K 2370/143* (2019.05)

(58) Field of Classification Search
CPC .......... G06N 3/088; G06F 3/017; G06F 3/044
See application file for complete search history.

(56) References Cited

U.S. PATENT DOCUMENTS

| | | | | |
|---|---|---|---|---|
| 8,964,782 B2* | 2/2015 | Harley | ................. | H04J 3/1658 |
| | | | | 370/474 |
| 2005/0179646 A1* | 8/2005 | Lin | ....................... | G06F 3/0416 |
| | | | | 345/156 |
| 2008/0024129 A1* | 1/2008 | Heid | ...................... | G01R 33/54 |
| | | | | 324/307 |
| 2010/0061400 A1* | 3/2010 | Hong | .................... | H04L 1/0057 |
| | | | | 370/466 |
| 2015/0046884 A1* | 2/2015 | Moore | ................. | G06F 3/0346 |
| | | | | 715/863 |
| 2016/0239649 A1* | 8/2016 | Zhao | ..................... | H04W 12/06 |
| 2016/0299681 A1 | 10/2016 | Frojdh et al. | | |
| 2016/0328021 A1* | 11/2016 | Lee | ....................... | G06F 3/0304 |
| 2017/0232294 A1 | 8/2017 | Kruger et al. | | |
| 2018/0088663 A1* | 3/2018 | Zhang | ................ | G06K 9/00389 |
| 2018/0095596 A1* | 4/2018 | Turgeman | ............. | G06F 3/0416 |

(Continued)

OTHER PUBLICATIONS

Ahlrichs C., "Development and Evaluation of AI-Based Parkinson's Disease Related Motor Symptom Detection Algorithms," Thesis, Jul. 6, 2015, 300 pages.

(Continued)

*Primary Examiner* — David E Choi
(74) *Attorney, Agent, or Firm* — FisherBroyles, LLP (57) ABSTRACT

A method for classifying a gesture made in proximity to a touch interface. A system receives data related to the position and/or movement of hand. The data is delimited by identifying a variable length window of touch frames. The variable length window of touch frames is selected to include touch frames indicative of feature data. The variable length window of touch frames is classified based upon classifications learned by the classifying module to identify gestures.

20 Claims, 4 Drawing Sheets

(56) References Cited

U.S. PATENT DOCUMENTS

2018/0121048 A1\* 5/2018 Tamura ................. G06F 3/0488
2020/0012946 A1\* 1/2020 Costa ...................... G06F 3/017

OTHER PUBLICATIONS

Chen Q., et al., "Learning Optimal Warping Window Size of DTW for Time Series Classification," The 11th International Conference on Information Science, Signal Processing and their Applications (ISSPA), Sep. 24, 2012, 6 pages.

Hassink N., et al., "Gesture Recognition in a Meeting Environment," University of Twente, The Netherlands, 2006, 115 Pages.

International Preliminary Report on Patentability for International Application No. PCT/US2019/040679, dated Jan. 21, 2021, 10 Pages.

International Search Report and Written Opinion for International Application No. PCT/US2019/040679, dated Oct. 23, 2019, 13 Pages.

\* cited by examiner

DELIMITATION IN UNSUPERVISED CLASSIFICATION OF GESTURES

FIELD

The disclosed systems and methods relate in general to the field of human-machine interfaces, in particular the system and methods are directed to learning gestures.

BACKGROUND

In recent years, capacitive touch sensors for touch screens have gained in popularity, in addition to the development of multi-touch technologies. A capacitive touch sensor comprises rows and columns of conductive material in spatially separated layers (sometimes on the front and back of a common substrate). To operate the sensor, a row is stimulated with an excitation signal. The amount of coupling between each row and column can be affected by an object proximate to the junction between the row and column (i.e., taxel, tixel). In other words, a change in capacitance between a row and column can indicate that an object, such as a finger, is touching the sensor (e.g., screen) near the region of intersection of the row and column.

While sensors have enabled faster sensing of touches on planar and non-planar surfaces, expanding their use for obtaining information relative to the identification, and/or position and orientation of body parts (for example, the finger(s), hand, arm, shoulder, leg, etc.) is challenging.

BRIEF DESCRIPTION OF THE DRAWINGS

The foregoing and other objects, features, and advantages of the disclosure will be apparent from the following more particular description of embodiments as illustrated in the accompanying drawings, in which reference characters refer to the same parts throughout the various views. The drawings are not necessarily to scale, emphasis instead being placed upon illustrating principles of the disclosed embodiments.

DETAILED DESCRIPTION

In various embodiments, the present disclosure is directed to systems (e.g., objects, panels or keyboards) sensitive to hover, contact, pressure, gestures and body posturing and their applications in real-world, artificial reality, virtual reality and augmented reality settings. It will be understood by one of ordinary skill in the art that the disclosures herein apply generally to all types of systems using fast multi-touch to detect hover, contact, pressure, gestures and body posturing. In an embodiment, the present system and method can be applied to, but not limited to controllers, handlebars, steering wheels, panels, display surfaces, including but not limited.

Throughout this disclosure, the terms "touch", "touches", "touch event", "contact", "contacts", "hover", or "hovers", "gesture", "pose" or other descriptors may be used to describe events or periods of time in which a user's finger, a stylus, an object, or a body part is detected by a sensor. In some sensors, detections occur only when the user is in physical contact with a sensor, or a device in which it is embodied. In some embodiments, and as generally denoted by the word "contact", these detections occur as a result of physical contact with a sensor, or a device in which it is embodied. In other embodiments, and as sometimes generally referred to by the terms "hover", "gesture" or "pose" the sensor may be tuned to allow for the detection of "touch events" that are at a distance above the touch surface or otherwise separated from the sensor device and causes a recognizable change, despite the fact that the conductive or capacitive object, e.g., a stylus or pen, is not in actual physical contact with the surface. Therefore, the use of language within this description that implies reliance upon sensed physical contact should not be taken to mean that the techniques described apply only to those embodiments; indeed, nearly all, if not all, of what is described herein would apply equally to "contact", "hover", "pose" and "gesture" each of which is a touch or touch event. Generally, as used herein, the word "hover" refers to non-contact touch events or touch, and as used herein the terms "hover", "pose" and gesture" are types of "touch" in the sense that "touch" is intended herein. Thus, as used herein, the phrase "touch event" and the word "touch" when used as a noun include a near touch and a near touch event, or any other gesture that can be identified using a sensor. "Pressure" refers to the force per unit area exerted by a user contact (e.g., presses by their fingers or hand) against the surface of an object. The amount of "pressure" is similarly a measure of "contact", i.e., "touch". "Touch" refers to the states of "hover", "contact", "gesture", "pose", "pressure", or "grip", whereas a lack of "touch" is generally identified by signals being below a threshold for accurate measurement by the sensor. In accordance with an embodiment, touch events may be detected, processed, and supplied to downstream computational processes with very low latency, e.g., on the order of ten milliseconds or less, or on the order of less than one millisecond.

As used herein, and especially within the claims, ordinal terms such as first and second are not intended, in and of themselves, to imply sequence, time or uniqueness, but rather, are used to distinguish one claimed construct from another. In some uses where the context dictates, these terms may imply that the first and second are unique. For example, where an event occurs at a first time, and another event occurs at a second time, there is no intended implication that the first time occurs before the second time, after the second time or simultaneously with the second time. However, where the further limitation that the second time is after the first time is presented in the claim, the context would require reading the first time and the second time to be unique times. Similarly, where the context so dictates or permits, ordinal terms are intended to be broadly construed so that the two identified claim constructs can be of the same characteristic or of different characteristic. Thus, for example, a first and a second frequency, absent further limitation, could be the same frequency, e.g., the first frequency being 10 Mhz and the second frequency being 10 Mhz; or could be different frequencies, e.g., the first frequency being 10 Mhz and the second frequency being 11 Mhz. Context may dictate otherwise, for example, where a first and a second frequency are further limited to being frequency-orthogonal to each other, in which case, they could not be the same frequency.

The presently disclosed systems and methods provide for designing, manufacturing and using capacitive touch sensors, and particularly capacitive touch sensors that employ a multiplexing scheme based on orthogonal signaling such as but not limited to frequency-division multiplexing (FDM), code-division multiplexing (CDM), or a hybrid modulation technique that combines both FDM and CDM methods. References to frequency herein could also refer to other orthogonal signal bases. As such, this application incorporates by reference Applicants' prior U.S. Pat. No. 9,019,224, entitled "Low-Latency Touch Sensitive Device" and U.S. Pat. No. 9,158,411 entitled "Fast Multi-Touch Post Processing." These applications contemplate FDM, CDM, or FDM/CDM hybrid touch sensors which may be used in connection with the presently disclosed sensors. In such sensors, touches are sensed when a signal from a row is coupled (increased) or decoupled (decreased) to a column and the result received on that column. By sequentially exciting the rows and measuring the coupling of the excitation signal at the columns, a heatmap reflecting capacitance changes, and thus proximity, can be created.

This application also employs principles used in fast multi-touch sensors and other interfaces disclosed in the following: U.S. Pat. Nos. 9,933,880; 9,019,224; 9,811,214; 9,804,721; 9,710,113; and 9,158,411. Familiarity with the disclosure, concepts and nomenclature within these patents is presumed. The entire disclosure of those patents and the applications incorporated therein by reference are incorporated herein by reference. This application also employs principles used in fast multi-touch sensors and other interfaces disclosed in the following: U.S. patent application Ser. Nos. 15/162,240; 15/690,234; 15/195,675; 15/200,642; 15/821,677; 15/904,953; 15/905,465; 15/943,221; 62/540,458, 62/575,005, 62/621,117, 62/619,656 and PCT publication PCT/US2017/050547, familiarity with the disclosures, concepts and nomenclature therein is presumed. The entire disclosure of those applications and the applications incorporated therein by reference are incorporated herein by reference.

The term "controller" as used herein is intended to refer to a physical object that provides the function of human-machine interface. In an embodiment, the controller may be handlebars of vehicle, such as a motorcycle. In an embodiment, the controller may be the steering wheel of vehicle, such as car or boat. In an embodiment, the controller is able to detect the movements of a hand by sensing such movements directly. In an embodiment, the controller may be the interface used with a video game system. In an embodiment, the controller may provide the position of a hand. In an embodiment, the controller may provide pose, position and/or movement of other body parts through the determination of movement proximate to and/or associated with the body part and/or function, for example, the articulation of the bones, joints and muscles and how it translates into the position and/or movement of the hand or foot.

The controllers discussed herein use antennas that function as transmitters and receivers. However, it should be understood that whether the antennas are transmitters, receivers, or both depends on context and the embodiment. When used for transmitting, the conductor is operatively connected to a signal generator. When used for receiving, the conductor is operatively connected to a signal receiver. In an embodiment, the transmitters and receivers for all or any combination of the patterns are operatively connected to a single integrated circuit capable of transmitting and receiving the required signals. In an embodiment, the transmitters and receivers are each operatively connected to a different integrated circuit capable of transmitting and receiving the required signals, respectively. In an embodiment, the transmitters and receivers for all or any combination of the patterns may be operatively connected to a group of integrated circuits, each capable of transmitting and receiving the required signals, and together sharing information necessary to such multiple IC configuration. In an embodiment, where the capacity of the integrated circuit (i.e., the number of transmit and receive channels) and the requirements of the patterns (i.e., the number of transmit and receive channels) permit, all of the the transmitters and receivers for all of the multiple patterns used by a controller are operated by a common integrated circuit, or by a group of integrated circuits that have communications therebetween. In an embodiment, where the number of transmit or receive channels requires the use of multiple integrated circuits, the information from each circuit is combined in a separate system. In an embodiment, the separate system comprises a GPU and software for signal processing.

The purpose of the transmitters and receivers discussed herein are to detect touch events, movements, motions, and gestures, such as hover, proximity, hand position, gestures, poses, etc. with 3D positional fidelity. The transmitted signals can be transmitted in a particular direction. In an embodiment a mixed signal integrated circuit is used. The mixed signal integrated circuit comprises a signal generator, transmitter, receiver and signal processor. In an embodiment, the mixed signal integrated circuit is adapted to generate one or more signals and transmit the signals. In an embodiment, the mixed signal integrated circuit is adapted to generate a plurality of frequency orthogonal signals and send the plurality of frequency orthogonal signals to the transmitters. In an embodiment, the frequency orthogonal signals are in the range from DC up to about 2.5 GHz. In an embodiment, the frequency orthogonal signals are in the range from DC up to about 1.6 MHz. In an embodiment, the frequency orthogonal signals are in the range from 50 KHz to 200 KHz. The frequency spacing between the frequency orthogonal signals is typically greater than or equal to the reciprocal of an integration period (i.e., the sampling period). In an embodiment, the frequency of the signal is not changed and the amplitude of the signal is modulated instead.

In an embodiment, the signal processor of a mixed signal integrated circuit (or a downstream component or software) is adapted to determine at least one value representing each frequency orthogonal signal that is transmitted. In an embodiment, the signal processor of the mixed signal integrated circuit (or a downstream component or software) performs a Fourier transform to received signals. In an embodiment, the mixed signal integrated circuit is adapted to digitize received signals. In an embodiment, the mixed signal integrated circuit (or a downstream component or software) is adapted to digitize received signals and perform a discrete Fourier transform (DFT) on the digitized information. In an embodiment, the mixed signal integrated circuit (or a downstream component or software) is adapted to digitize received signals and perform a Fast Fourier transform (FFT) on the digitized information—an FFT being one type of discrete Fourier transform.

It will be apparent to a person of skill in the art in view of this disclosure that a DFT, in essence, treats the sequence of digital samples (e.g., window) taken during a sampling period (e.g., integration period) as though it repeats. As a consequence, signals that are not center frequencies (i.e., not integer multiples of the reciprocal of the integration period (which reciprocal defines the minimum frequency spacing)), may have relatively nominal, but unintended consequence of contributing small values into other DFT bins. Thus, it will also be apparent to a person of skill in the art in view of this disclosure that, the term orthogonal as used herein is not "violated" by such small contributions. In other words, as we use the term frequency orthogonal herein, two signals are considered frequency orthogonal if substantially all of the contribution of one signal to the DFT bins is made to different DFT bins than substantially all of the contribution of the other signal.

In an embodiment, received signals are sampled at at least 1 MHz. In an embodiment, received signals are sampled at at least 2 MHz. In an embodiment, received signals are sampled at 4 Mhz. In an embodiment, received signals are sampled at 4.096 Mhz. In an embodiment, received signals are sampled at more than 4 MHz.

To achieve kHz sampling, for example, 4096 samples may be taken at 4.096 MHz. In such an embodiment, the integration period is 1 millisecond, which per the constraint that the frequency spacing should be greater than or equal to the reciprocal of the integration period provides a minimum frequency spacing of 1 KHz. (It will be apparent to one of skill in the art in view of this disclosure that taking 4096 samples at e.g., 4 MHz would yield an integration period slightly longer than a millisecond, and not not achieving kHz sampling, and a minimum frequency spacing of 976.5625 Hz.) In an embodiment, the frequency spacing is equal to the reciprocal of the integration period. In such an embodiment, the maximum frequency of a frequency-orthogonal signal range should be less than 2 MHz. In such an embodiment, the practical maximum frequency of a frequency-orthogonal signal range should be less than about 40% of the sampling rate, or about 1.6 MHz. In an embodiment, a DFT (which could be an FFT) is used to transform the digitized received signals into bins of information, each reflecting the frequency of a frequency-orthogonal signal transmitted which may have been transmitted by the transmit antenna 130. In an embodiment 2048 bins correspond to frequencies from 1 KHz to about 2 MHz. It will be apparent to a person of skill in the art in view of this disclosure that these examples are simply that, exemplary. Depending on the needs of a system, and subject to the constraints described above, the sample rate may be increased or decreased, the integration period may be adjusted, the frequency range may be adjusted, etc.

In an embodiment, a DFT (which can be an FFT) output comprises a bin for each frequency-orthogonal signal that is transmitted. In an embodiment, each DFT (which can be an FFT) bin comprises an in-phase (I) and quadrature (Q) component. In an embodiment, the sum of the squares of the I and Q components is used as measure corresponding to signal strength for that bin. In an embodiment, the square root of the sum of the squares of the I and Q components is used as measure corresponding to signal strength for that bin. It will be apparent to a person of skill in the art in view of this disclosure that a measure corresponding to the signal strength for a bin could be used as a measure related to an event. In other words, the measure corresponding to signal strength in a given bin would change as a result of a position, gesture, motion, touch event, etc.

The principles discussed above are used in addition to other features of the signal transmission in order to obtain meaningful information regarding positions, gestures, motions, touch events, etc. of various body parts. In an embodiment, the system and methods disclosed herein use various properties of the transmitted signals in order to process this information to provide accurate depictions of hand positions and gestures.

Figure 1:
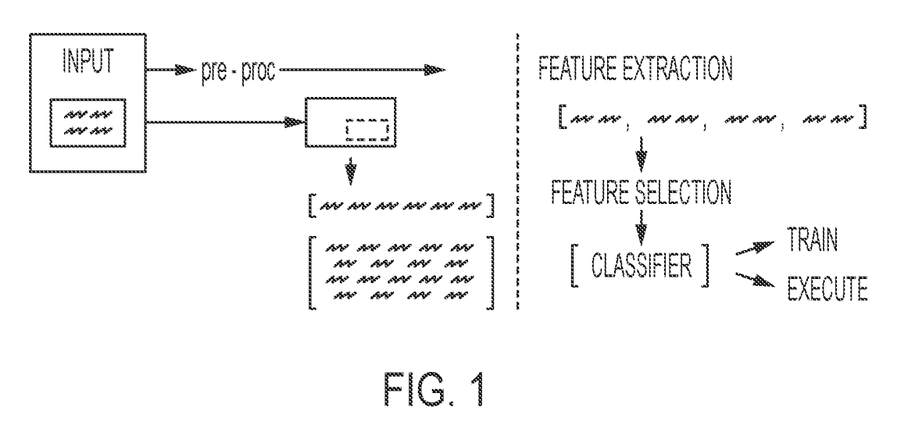
FIG. 1 is a diagram showing an overview of the system.

Turning to FIG. 1, shown is a diagram showing an overview of a system that is used in order to classify gestures. The classification of gestures is accomplished through the identification and classification of feature data within touch frames. In an embodiment, the data is data that has been received from the fast multi-touch sensors. That data is indicative of touch events, etc., that have occurred. This data is sent to pre-processors in order to transform the data into vectors, matrices or images. How the data is transformed is determined by the particular feature which may be extracted and the type of data that is received.

In an embodiment, the data stream that is received is a stream of touch frames. The touch frames are reflective of touch data that occurs in proximity to touch interface during a period of time. In an embodiment the touch frames may be heatmaps.

Once the data is transformed in some manner, feature extraction can be performed. For example the maximum and minimum values of the transformed received data can be used and associated with a particular feature. For example, for each tixel in the touch frame an average variant of 10 tixels can be selected in order to identify a feature to be extracted. In another example, a cross-product of 4 tixels within the touch frame can be used in order to identify the feature to be extracted. In an embodiment, the features are part of a feature array that contains multiple features.

After feature extraction, feature selection occurs. In an embodiment, the features selected are plurality of tixels. In an embodiment, the features are transformations of one or more tixels. For example, a number of extracted features may have better quality data or be indicative of a particular feature. In an embodiment, the selected number of extracted features may be of a limited number. The selected features are then sent to a classifier for training and/or classifying the selected features. After training and/or in addition to training, the system is able to output a result that is in conformance with the desired outcome. For example, upon receiving a number of touch frames reflective of touch data in proximity to a touch interface during a period of time the feature data contained within the touch data can be indicative of a particular gesture that the system has learned to classify. The system can then output that that gesture has been performed.

Figure 2:
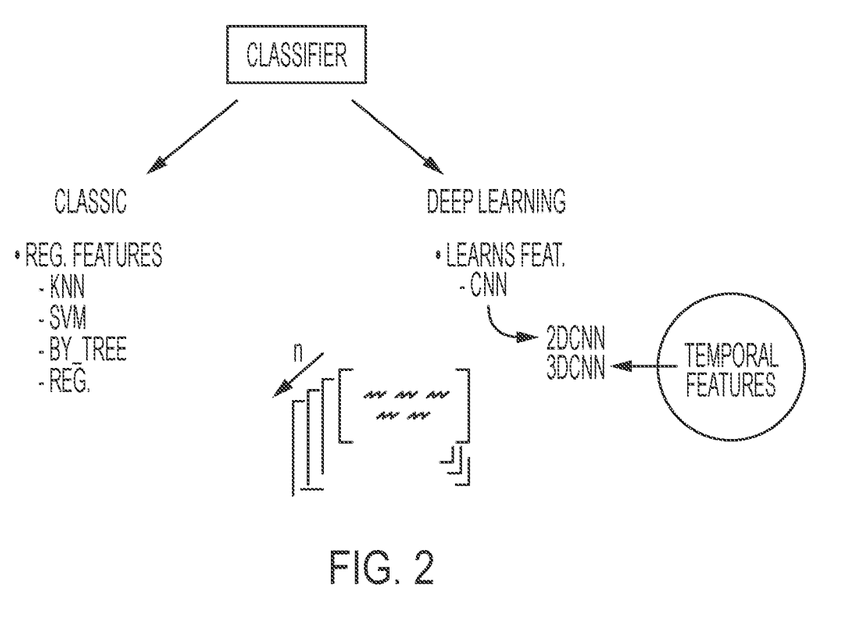
FIG. 2 is a diagram illustrating the classification of features.

FIG. 2 shows a number of algorithms that can be implemented in the classifying of the selected features. The classification can be broken down into two groups of classification "classical" and "deep learning." These algorithms may also be broken down into "supervised" and "unsupervised". Classical learning requires predetermined features in order to be implemented. The predetermined features are provided to the system in order to train the system to perform the appropriate classification. Some examples of classical learning are k nearest neighbor (KNN) and support vector clustering (SVC). The features used in classical learning are already set forth and defined in some way prior to the receipt of a new stream of touch frames. The parameters for which the classical learning algorithm is to look for are preset and used to classify a particular movement or gesture.

Deep learning is a way of providing unsupervised learning and is able to learn the features that are to be used in providing future classification of gestures. Some examples of unsupervised learning algorithms are CNN convolutional neural network (CNN), which can be 2D CNN or 3D CNN (in which temporal features are taken into account). Deep learning provides a way for the system to select those features to be used for classification without having to prescribe the boundaries used in the classification process.

Figure 3:
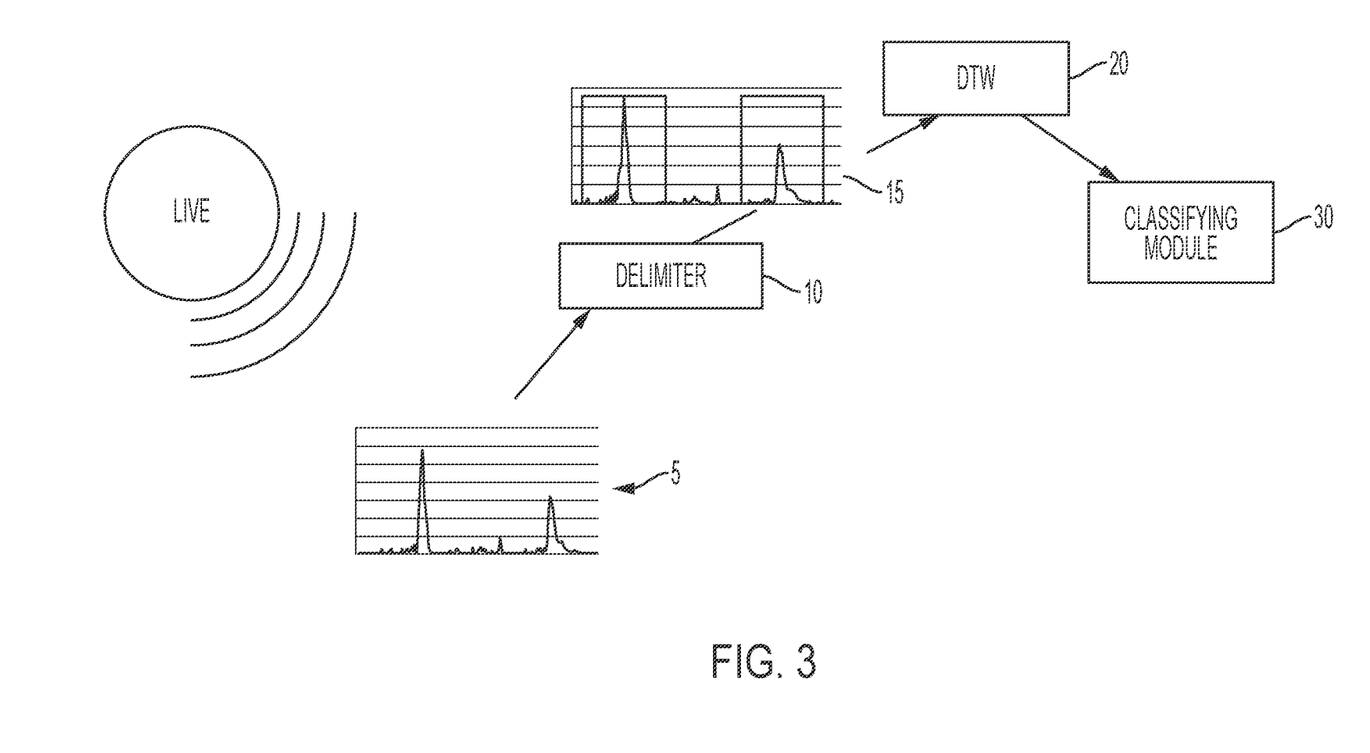
FIG. 3 is a diagram illustrating delimitation and learning of the gestures.

FIG. 3 shows an embodiment of the system and method discussed herein. The circle marked as live represents the production of real time data being generated for use by the system. In FIG. 3, the live data is gesture related data. The live data is producing a stream of touch frames. The stream of touch frames is data that is being generated through use of the system and a movement or gesture will produce the stream of touch frames.

By way of example a gesture will be discussed herein, however it should be understood that any touch event, as discussed elsewhere in this application, may also be used in the system. Input into the system is data received from a touch interface, such as FMT sensors. In an embodiment, the gesture is a movement associated with the operation of a motorcycle. In an embodiment, the gesture is a movement detected via FMT sensors on the handlebars of a motorcycle. In an embodiment, the gesture is movement that is made in proximity to a controller.

Motions made by the user are detected by the touch interface and transmitted to the system. The motions made produce a stream of touch frames. The stream of touch frames is processed and converted into variable length windows of touch frames. In an embodiment, the measured signal for a given tixel is processed on a frame by frame basis. In an embodiment, the measured signal is processed for each tixel in the system. A running average of the past N frames can be determined by the system. The system can then calculate a standard deviation of the past N frames using the running average. The system can then record whether or not a tixel's current value is greater than a mean plus M times the standard deviation (current value is >(mean+M*stdev)) or less than a mean minus M times the standard deviation. Tixel values that fall in this range indicate that the tixel's value is changing rapidly. In an embodiment, tixels whose values fall in these ranges are labeled as "outliers" and the total number of "outlier" tixels of each input frame is recorded. Using this information a time series for changes can be output that looks like the graph 5 illustrated in FIG. 3. This stream of touch frames is sent to the delimiter 10.

The delimiter 10 takes the stream of data, such as the touch frames, it receives and identifies a variable length window of touch frames based upon the stream of touch frames. The variable length windows of touch frames are selected to include touch frames indicative of feature data. The feature data being indicative of gestures. The variable length windows of touch frames are a selection of the touch frames over a period of time. In an embodiment, the variable length windows of touch frames selected may be variable length windows of touch frames that exhibit a peak in the data (as shown in the graph 5). In an embodiment, the variable length windows of touch frames selected are taken to accommodate a period of time prior to and after a peak. In an embodiment, the variable length window of touch frames are taken to accommodate a period of time prior to and after a number of peaks. In an embodiment, the variable length windows of touch frames are taken to capture only peaks with certain properties. In an embodiment, the variable length windows of touch frames are taken to capture peaks that exceed a certain threshold. The size and number of variable length windows of touch frames may be predetermined and adjusted in order to increase sensitivity and/or decrease latency.

In an embodiment, the delimiter 10 identifies the number of outliers in each touch frames until a sequence of frames is identified with a number of outliers above a threshold. This first such touch frame above the threshold is recorded as the initial window frame. The delimiter 10 then continues to read touch frames until the number of outlier touch frames falls below a second threshold. The first touch frame below this second threshold is recorded as the ending touch frame for the variable length window of touch frames. In a variation of this embodiment, the delimiter 10 continues to read the number of outliers from each touch frame until an additional P number of touch frames are read that are all below threshold. If the number of outliers increases back above a threshold, then the delimiter 10 will adjust the value of the ending touch frame for the variable window of touch frames accordingly. In this manner, the delimiter 10 is able to identify gestures that contain multiple peaks of outliers.

By applying the delimiter 10, data that is the most representative of data indicative of gestures can be sent to the classifier module 30 for application of the learning algorithm. In an embodiment, the classifying module 30 applies a deep learning algorithm, such as those discussed above. In an embodiment, the classifying module 30 is a classical learning algorithm, such as those discussed above. The delimiter 10 decreases the latency in the system by enabling rapid screening of the stream of touch frames coming in so that only the preferred candidates make it through. In an embodiment, the delimiter 10 operates in an unsupervised manner to select and send windows of touch frames to the classifying module 30. The variable windows of touch frames is illustrated by the graph 15 shown in FIG. 3.

Each of the windows of touch frames may not be the same size. For example, a window of touch frames may be capturing a plurality of peaks which may be a greater size than another window of touch frames with a plurality of peaks. In an embodiment, the non-standardized window of touch frames may be normalized in order to make the data easier to process by the classifying module 30. In an embodiment, the data is normalized using dynamic time warping 20. In an embodiment, the window of touch frames may be set to have a predetermined size. In an embodiment the variable windows of touch data may be wrapped in larger windows in order to provide a standard size to the classifying module 30. The variable length window of touch frames can be normalized to create a fixed length array of touch frames. Each of the windows of touch frames can be increased or decreased to accommodate the normalization process. The normalized window of touch frames are then sent to the classifying module 30. In an embodiment, the variable length windows of touch frames are interpolated prior to classification. In an embodiment, the variable length windows of touch frames are interpolated during classification.

In an embodiment, the normalization process does not have to occur. In an embodiment, the learning module takes the differently sized variable windows of touch frames and uses the information related to their size in order to further classify the received windows of touch frames. For example a touch frame of a particular size may be indicative of a particular gesture. For example, a touch frame indicative of a particular gesture but having a different sized window of touch frames may be indicative of different aspect of that gesture.

In an embodiment, the identified window of frames is padded before and/or after so that it becomes a known length of a window of touch frames before it is sent to the classifying module 30. In another embodiment, the classifying module 30 is capable of handling windows of variable lengths, and there is no need for the application of the DTW 20. In another embodiment, the DTW 20 is a null op and the window of touch frames is sent to one of a number of classifying modules 30 based on the number of touch frames in the window.

When the classifying module 30 employs a deep learning, such as the CNN deep learning discussed above, the received windows of touch frames can be used in modeling the gesture. The classifying module 30 can take the windows of touch frames and compare it to the information on which it has already been trained. The received information can also be used in order to further train the system.

Figure 4:
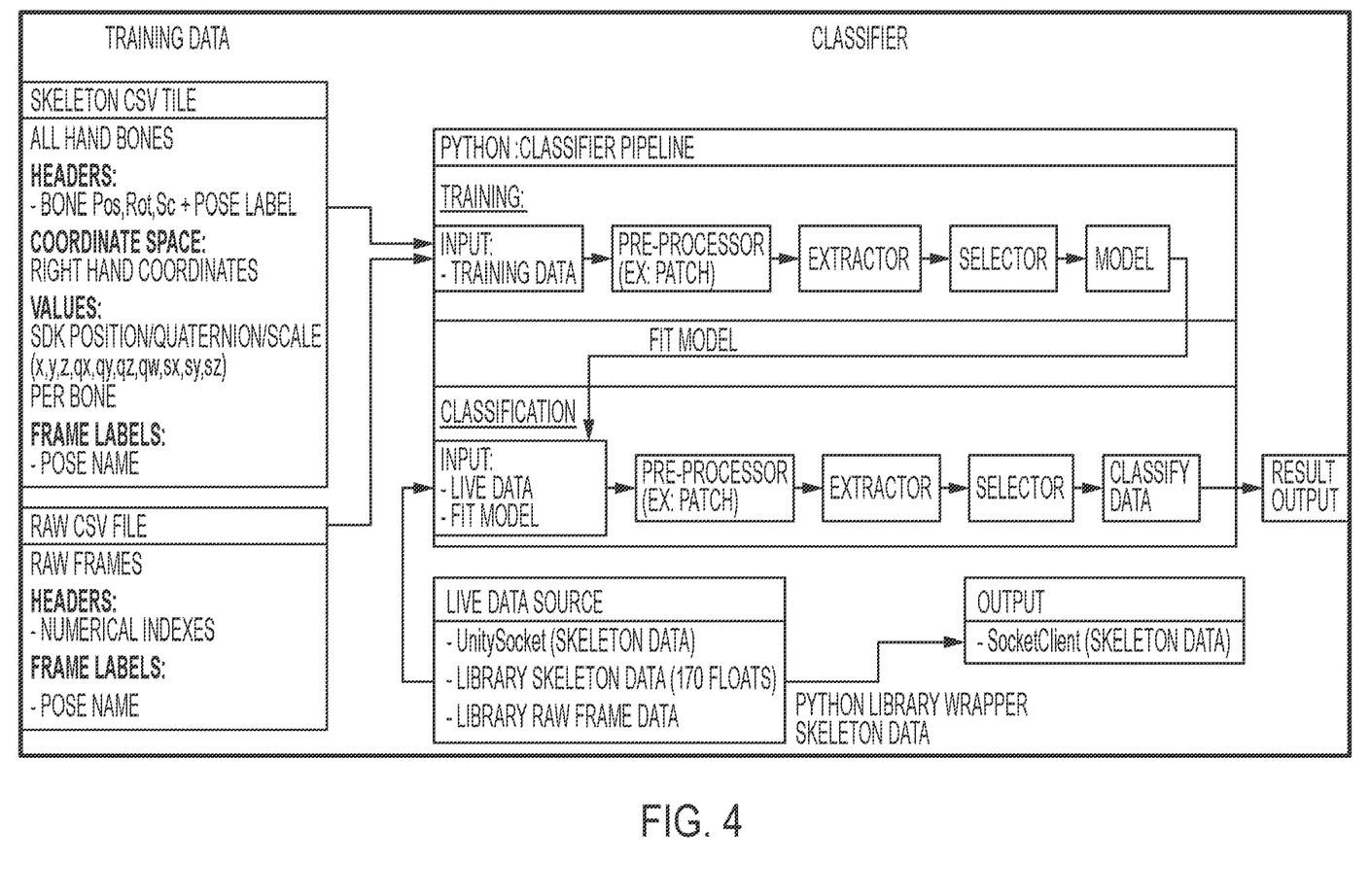
FIG. 4 is a flow chart showing the logic of the computer.

Turning to FIG. 4, shown is a flow chart showing the logic of the computer for modeling gestures. The system shows training data and the classifier processes that are used with the training data.

The training data for the system can come from the skeleton CSV files that provide data related to the hand bones, bone position, rotation, movement, etc. The frames can be labeled with the pose names for the frames. The training data can also include raw data in a CSV or equivalent format. The raw data can come from the live touch frames produced by the touch interface of the system.

The training data is sent to the system to train the classifying module 30. The training data goes to the input and can contain skeleton CSV files and raw CSV files. The training data goes to a preprocessor. The training data then goes to an extractor module, where the training data is processed to extract a feature that is used for the classifying of gestures. The training data is then sent to a selector module where the feature is selected for use in the classifying of gestures. The data is then modeled. The fit model data is then sent to the classification module 30.

The classification module 30 receives as input the fit model as well as live data in order to further train the system for the classification of gestures. The processing and handling of the live data is discussed in more detail above, with respect to FIG. 3. The live data or the fit model may go to a preprocessor. From the preprocessor the live data or the fit model may go to the extractor module. From the extractor module the live data or the fit model may go to the selector module. From the selector module the live data or the fit model may to the classification module 30. The classification module 30 then outputs the result. In an embodiment, the result of the output of the classification module 30 is a gesture. In an embodiment, the modeling algorithm employed by the system is a deep learning algorithm. In an embodiment the algorithm employed is a CNN based algorithm.

The architecture set forth in FIG. 4 is illustrative of a system used to model gestures. After training of the system, the system is able to continue to refine its ability to model various gestures. While the system and method have been discussed with respect to an implementation using gestures, it should be known that the system and method are applicable to other types of body movements or human computer interaction. For example, foot movements may be modeled, or any combination of movements of the body, arms, legs, etc.

In an embodiment, a method for classifying the gestures made in proximity to a touch interface comprises receiving a stream of touch frames, each touch frame in the stream of touch frames being reflective of touch data in proximity to a touch interface during a period of time; delimiting the stream of touch frames, the step of delimiting including identifying a variable length window of touch frames based upon the stream of touch frames, the variable length window of touch frames being selected to include touch frames indicative of feature data; and classifying the variable length window of touch frames based upon classifications learned by a classifying module to identify a gesture.

In an embodiment, a method for classifying the gestures made in proximity to a touch interface comprises receiving a stream of touch frames, each touch frame in the stream of touch frames being reflective of touch data in proximity to a touch interface during a period of time; delimiting the stream of touch frames, the step of delimiting including identifying a variable length window of touch frames based upon the stream of touch frames, the variable length window of touch frames being selected to include touch frames indicative of feature data; and modifying the variable length window of touch frames to produce a fixed length touch frame window; and classifying the fixed length touch frame window based upon classifications learned by a classifying module to identify a gesture.

In an embodiment, a method for classifying the gestures made in proximity to a touch interface comprises delimiting a plurality of touch frames, each touch frame being reflective of touch data in proximity to a touch interface during a period of time, the step of delimiting identifying a window of touch frames based upon the touch, the window of touch frames being selected to include touch frames indicative of feature data; interpolating the window of touch frames in a time dimension to produce a standard length touch frame window; and classifying the standard length touch frame window based upon classifications learned by a classifying module to identify a gesture.

In an embodiment, a method for classifying the gestures made in proximity to a touch interface comprises delimiting a plurality of touch frames, each touch frame being reflective of touch data in proximity to a touch interface during a period of time, the step of delimiting identifying a window of touch frames based upon the touch frames, the window of touch frames being selected to include touch frames indicative of feature data; producing a classification data-set of classifications learned by a classifying module; interpolating the classification data-set in a time dimension to produce a modified length classification data-set in each of a plurality of lengths; delimiting a plurality of touch frames, each touch frame being reflective of touch data in proximity to a touch interface during a period of time, the step of delimiting identifying a window of touch frames based upon the touch frames, the window of touch frames being selected to include touch frames indicative of feature data; selecting the modified length classification data-set that matches a number of frames time in the window of touch frames; and classifying the window of touch frames based upon the selected modified length classification data-set classifications learned by a classifying module to identify a gesture.

In an embodiment, a method for classifying the gestures made in proximity to a touch interface comprises receiving a stream of touch frames, each touch frame in the stream of touch frames being reflective of touch data in proximity to a touch interface during a period of time; delimiting the stream of touch frames, the step of delimiting including identifying a window of touch frames based upon the stream of touch frames being selected to include touch frames indicative of feature data; and classifying the window of touch frames based upon classifications learned by a classifying module to identify a gesture.

While the invention has been particularly shown and described with reference to a preferred embodiment thereof, it will be understood by those skilled in the art that various changes in form and details may be made therein without departing from the spirit and scope of the invention.

What is claimed is:

1. A method comprising:
   receiving a stream of touch frames, wherein:

each touch frame in the stream of touch frames reflects touch data in proximity to a touch interface during a period of time;
the touch interface comprises one or more touch sensors;
each touch frame in the stream of touch frames comprises one or more tixels; and
each of the one or more tixels comprises a measurement of a corresponding one of the one or more touch sensors;
delimiting the stream of touch frames, the step of delimiting including identifying a variable length window of touch frames based upon the stream of touch frames, the variable length window of touch frames being selected to include touch frames indicative of three-dimensional feature data of a gesture; and
classifying the variable length window of touch frames based upon classifications learned by a classifying module to identify the gesture.

2. The method of claim 1, wherein:
the one or more touch sensors comprise a plurality of capacitive touch sensors;
each touch frame in the stream of touch frames comprises a plurality of tixels; and
each of the plurality of tixels comprises a measurement of a corresponding one of the plurality of capacitive touch sensors.

3. The method of claim 2, wherein:
the plurality of capacitive touch sensors are arranged in rows and columns; and
the plurality of tixels are arranged in an equal number of rows and an equal number of columns.

4. The method of claim 2, wherein each touch frame in the stream of touch frames comprises two-dimensional feature data of the gesture.

5. The method of claim 1, wherein classifying the variable length window of touch frames to identify the gesture comprises determining at least one of a three-dimensional position or a three-dimensional orientation of one or more body parts involved in the gesture.

6. The method of claim 5, wherein the one or more body parts comprise one or more of:
a finger;
a hand;
an arm;
a shoulder; or
a leg.

7. The method of claim 1, wherein the gesture is applicable to a motorcycle handle.

8. The method of claim 1, wherein the gesture is applicable to a controller.

9. A method comprising:
receiving a stream of touch frames, wherein:
each touch frame in the stream of touch frames reflects touch data in proximity to a touch interface during a period of time;
the touch interface comprises one or more touch sensors;
each touch frame in the stream of touch frames comprises one or more tixels; and
each of the one or more tixels comprises a measurement of a corresponding one of the one or more touch sensors;
delimiting the stream of touch frames, the step of delimiting including identifying a variable length window of touch frames based upon the stream of touch frames, the variable length window of touch frames being selected to include touch frames indicative of three-dimensional feature data of a gesture;
modifying the variable length window of touch frames to produce a fixed length touch frame window; and
classifying the fixed length touch frame window based upon classifications learned by a classifying module to identify the gesture.

10. The method of claim 9, wherein the step of modifying the variable length window of touch frames is achieved through an application of a division time warping algorithm.

11. The method of claim 9, wherein the step of modifying the variable length window of touch frames is achieved via an interpolation of time.

12. The method of claim 9, wherein the step of modifying the variable length window of touch frames is achieved by inserting the variable length window into a larger fixed length window.

13. The method of claim 9, wherein the variable length window of touch frames has a predetermined maximum length.

14. The method of claim 13, wherein the step of modifying the variable length window of touch frames is achieved by an interpolation of time.

15. A method comprising:
delimiting a plurality of touch frames, wherein:
each touch frame in the plurality of touch frames reflects touch data in proximity to a touch interface during a period of time;
the touch interface comprises one or more touch sensors;
each touch frame in the plurality of touch frames comprises one or more tixels;
each of the one or more tixels comprises a measurement of a corresponding one of the one or more touch sensors; and
the step of delimiting includes identifying a window of touch frames based upon the touch, the window of touch frames being selected to include touch frames indicative of three-dimensional feature data of a gesture;
interpolating the window of touch frames in a time dimension to produce a standard length touch frame window; and
classifying the standard length touch frame window based upon classifications learned by a classifying module to identify the gesture.

16. A method comprising:
receiving a stream of touch frames, wherein:
each touch frame in the stream of touch frames reflects touch data in proximity to a touch interface during a period of time;
the touch interface comprises one or more touch sensors;
each touch frame in the stream of touch frames comprises one or more tixels; and
each of the one or more tixels comprises a measurement of a corresponding one of the one or more touch sensors;
delimiting the stream of touch frames, the step of delimiting including identifying a window of touch frames based upon the stream of touch frames being selected to include touch frames indicative of three-dimensional feature data of a gesture; and
classifying the window of touch frames based upon classifications learned by a classifying module to identify the gesture.

17. The method of claim 16, wherein the classifying module is a deep learning module.

18. The method of claim 17, wherein the deep learning module is a CNN module.

19. The method of claim 16, wherein the classifying module is a classical learning module.

20. The method of claim 16, wherein:
- the one or more touch sensors comprise a plurality of capacitive touch sensors;
- each touch frame in the stream of touch frames comprises a plurality of tixels; and
- each of the plurality of tixels comprises a measurement of a corresponding one of the plurality of capacitive touch sensors.

* * * * *